(12) United States Patent
Kim et al.

(10) Patent No.: US 11,183,145 B2
(45) Date of Patent: Nov. 23, 2021

(54) DATA PROCESSING DEVICE, DATA DRIVING DEVICE, AND SYSTEM FOR DRIVING DISPLAY DEVICE USING TWO COMMUNICATION LINES

(71) Applicant: SILICON WORKS CO., LTD., Daejeon (KR)

(72) Inventors: Do Seok Kim, Daejeon (KR); Hyun Kyu Jeon, Daejeon (KR); Yong Hwan Mun, Daejeon (KR); Byung Guk Kim, Daejeon (KR); Myung Yu Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 16/653,476

(22) Filed: Oct. 15, 2019

(65) Prior Publication Data
US 2020/0126508 A1 Apr. 23, 2020

(30) Foreign Application Priority Data
Oct. 22, 2018 (KR) .......... 10-2018-0126042

(51) Int. Cl.
*G09G 5/00* (2006.01)
*G06F 1/08* (2006.01)
*G06F 9/50* (2006.01)

(52) U.S. Cl.
CPC .......... *G09G 5/008* (2013.01); *G06F 1/08* (2013.01); *G06F 9/5027* (2013.01); *G09G 2360/08* (2013.01)

(58) Field of Classification Search
None
See application file for complete search history.

(56) References Cited

U.S. PATENT DOCUMENTS

| | | | | |
|---|---|---|---|---|
| 5,990,802 A * | 11/1999 | Maskeny | ................. | G09F 9/33 340/815.42 |
| 7,015,902 B2 * | 3/2006 | Nagai | ...................... | G09G 3/32 345/204 |
| 7,898,518 B2 * | 3/2011 | Hong | ................... | G09G 3/3611 345/100 |
| 8,339,341 B2 * | 12/2012 | Ishiguchi | ............. | G09G 3/3648 345/100 |
| 8,681,084 B2 * | 3/2014 | Haga | .................... | G09G 3/3648 345/204 |
| 8,732,376 B2 * | 5/2014 | Saitoh | ..................... | G06F 3/041 710/307 |
| 8,878,828 B2 | 11/2014 | Baek et al. | | |
| 8,913,053 B2 * | 12/2014 | Ooga | ................... | G09G 3/3688 345/212 |
| 9,053,673 B2 | 6/2015 | Yuan et al. | | |
| 9,076,398 B2 * | 7/2015 | Su | ........................ | G09G 3/3611 |
| 9,857,911 B1 * | 1/2018 | Qu | ........................ | G06F 3/0416 |
| 10,001,886 B2 * | 6/2018 | Han | ........................ | G06F 3/044 |

(Continued)

FOREIGN PATENT DOCUMENTS

KR 10-1885186 B1 8/2018

*Primary Examiner* — Chad M Dicke
(74) *Attorney, Agent, or Firm* — Fenwick & West LLP

(57) ABSTRACT

An embodiment relates to a technology for accelerating data communication in a display device and provides a technology for transmitting and receiving at least some information using a communication line for indicating a clock training state.

14 Claims, 13 Drawing Sheets

(56) References Cited

U.S. PATENT DOCUMENTS

| | | | | |
|---|---|---|---|---|
| 10,013,906 B2* | 7/2018 | Lee | | G09G 3/3233 |
| 10,074,340 B2* | 9/2018 | Matsuda | | G09G 5/006 |
| 10,140,912 B2 | 11/2018 | Hekmat et al. | | |
| 10,141,963 B2* | 11/2018 | Yoo | | H04L 25/03146 |
| 10,162,780 B2* | 12/2018 | Choi | | G06F 13/4022 |
| 10,164,767 B2* | 12/2018 | Kim | | H04L 7/02 |
| 10,168,559 B2* | 1/2019 | Xiong | | G02F 1/133 |
| 10,217,397 B2* | 2/2019 | Lee | | G09G 5/006 |
| 10,380,971 B2* | 8/2019 | Oh | | G09G 5/008 |
| 10,593,382 B2* | 3/2020 | Kang | | G11C 7/1093 |
| 2006/0017715 A1* | 1/2006 | Kimura | | G09G 5/005 |
| | | | | 345/204 |
| 2009/0013114 A1* | 1/2009 | Sanders | | G06F 13/4278 |
| | | | | 710/110 |
| 2009/0303224 A1* | 12/2009 | Yoshida | | G09G 3/3648 |
| | | | | 345/213 |
| 2010/0045655 A1* | 2/2010 | Jang | | G09G 3/20 |
| | | | | 345/213 |
| 2012/0117443 A1* | 5/2012 | Lee | | H03M 13/09 |
| | | | | 714/758 |
| 2013/0076703 A1 | 3/2013 | Baek et al. | | |
| 2014/0354606 A1* | 12/2014 | Chen | | G09G 5/18 |
| | | | | 345/204 |
| 2015/0035817 A1* | 2/2015 | Hwang | | G09G 3/2092 |
| | | | | 345/212 |
| 2016/0125840 A1* | 5/2016 | Oh | | G09G 5/008 |
| | | | | 345/213 |
| 2016/0232874 A1* | 8/2016 | Matsuda | | G09G 5/008 |
| 2016/0357493 A1* | 12/2016 | Zerwas | | G06F 3/1438 |
| 2017/0132966 A1* | 5/2017 | Lim | | G09G 5/006 |
| 2018/0122294 A1* | 5/2018 | Do | | G09G 3/3275 |
| 2018/0218762 A1* | 8/2018 | Matsui | | G06F 13/4243 |
| 2019/0180709 A1* | 6/2019 | Lee | | G09G 3/3688 |
| 2019/0197941 A1* | 6/2019 | Lim | | G09G 3/20 |
| 2019/0371260 A1* | 12/2019 | Kim | | G09G 3/3275 |
| 2019/0385550 A1* | 12/2019 | Tian | | G09G 3/3648 |
| 2020/0097112 A1* | 3/2020 | Seo | | G09G 3/20 |

* cited by examiner

DATA PROCESSING DEVICE, DATA DRIVING DEVICE, AND SYSTEM FOR DRIVING DISPLAY DEVICE USING TWO COMMUNICATION LINES

CROSS-REFERENCE TO RELATED APPLICATION

This application claims priority from Republic of Korea Patent Application No. 10-2018-0126042, filed on Oct. 22, 2018, which is hereby incorporated by reference in its entirety.

BACKGROUND

1. Field of Technology

The present disclosure relates to a technology for driving a display device.

2. Description of the Prior Art

A display panel includes a plurality of pixels arranged in a matrix, and each pixel includes red (R), green (G), and blue (B) sub-pixels. Each sub-pixel emits light with a greyscale according to image data, thereby displaying an image on the display panel.

Image data is transmitted from a data processing device, called a timing controller, to a data driving device, called a source driver. Image data is transmitted as a digital value, and the data driving device converts the image data into an analog voltage to drive each pixel.

Image data individually or independently indicates the greyscale value of each pixel. Thus, as the number of pixels disposed on a display panel increases, the amount of image data increases. Further, as the frame rate increases, the amount of image data to be transmitted per unit time increases.

As a display panel has higher resolution in recent years, both the number of pixels arranged on a display panel and the frame rate have increased. Also, to process an increased amount of image data according to high resolution, data communication in a display device is required to be faster.

SUMMARY

An aspect of the present disclosure is to provide a technology for accelerating data communication in a display device. Another aspect of the present disclosure is to provide a technology for transmitting information, which can be transmitted through an existing main communication line, through an auxiliary communication line. Still another aspect of the present disclosure is to provide a technology for facilitating data communication via a main communication line by transmitting and receiving information through an auxiliary communication line before communication is performed via the main communication line. Yet another aspect of the present disclosure is to provide a technology for transmitting and receiving at least some of the information through a lock communication line for checking a clock training state.

To achieve foregoing aspects, an embodiment provides a data processing device including: a controlling unit configured to process image data; a first communication unit configured to include the image data in a first communication signal with a first clock embedded therein and to transmit the first communication signal to a data driving device through a first communication line; and a second communication unit configured to check a training state of the first clock from the data driving device through a second communication line and to transmit and receive at least some information to and from the data driving device through the second communication line.

In the data processing device, the second communication line may include a common bus of a single signal line and may be connected with a plurality of data driving devices. A pull-up resistor may be connected to the second communication line, and the second communication unit may control a signal voltage of the second communication line through a switch controlling the connection of the second communication line with a low voltage source.

In the data processing device, the first communication line may be a differential signal line driven by a current, the second communication line may be a single signal line driven as an open drain, and the data rate of the first communication line may be higher than the data rate of the second communication line.

In the data processing device, the second communication unit may transmit at least some of the configuration information to the data driving device through the second communication line in an initial time after the operation is started, and the first communication unit may transmit a training signal for the first clock to the data driving device after the at least some of the configuration information is transmitted. The first communication unit may: transmit the training signal for the first clock when a voltage at a first signal level is formed in the second communication line by the data driving device after the at least some of the configuration information is transmitted; and determine that training of the first clock by the data driving device is completed when a voltage at a second signal level is formed in the second communication line by the data driving device after the training signal for the first clock is transmitted.

In the data processing device, the second communication unit may transmit a state check command to check a state of the data driving device through the second communication line in an initial time after the operation is started, and may determine that the data driving device normally operates when a voltage at a first signal level is maintained in the second communication line for a predetermined time or longer by the data driving device after transmitting the state check command.

In the data processing device, the second communication unit may transmit a request command to the data driving device through the second communication line in a time period in which the image data is transmitted through the first communication line, and may receive reply data to the request command from the data driving device through the second communication line after transmitting the request command. The request command may include an identification (ID) number of the data driving device set by a plurality of pins.

In the data processing device, the second communication unit may include a transmission module configured to transmit a signal to the second communication line, a reception module configured to receive a signal from the second communication line, and a monitoring module configured to compare a TX signal transmitted by the transmission module with an RX signal received by the reception module and to generate an error when the TX signal and the RX signal are different. When the second communication unit generates the error, the first communication unit may perform a clock recovery sequence for retraining the first clock.

Another embodiment provides a data driving device including: a first communication unit configured to restore a first clock from a first communication signal received through a first communication line and to receive image data included in the first communication signal from a data processing device according to the first clock; a second communication unit configured to transmit a training state of the first clock to the data processing device through a second communication line and to transmit and receive at least some information to and from the data processing device through the second communication line; and a controlling unit configured to drive a pixel disposed on a panel according to the image data.

In the data driving device, the second communication unit may operate in a lock mode for transmitting the training state of the first clock and in a communication mode for transmitting and receiving the at least some information. The second communication unit may receive at least some of the configuration information from the data processing device through the second communication line in an initial time after the operation is started, and the controlling unit may set some internal parameters according to the at least some of the configuration information before receiving a training signal for the first clock. The communication mode may be divided into a reception mode and a transmission mode, and the second communication unit may be switched to the transmission mode or the lock mode after a voltage at a second signal level is maintained in the second communication line for a predetermined time in the reception mode. The controlling unit may check an identification (ID) number set by a plurality of pins, and the second communication unit may process only a signal corresponding to the identification number among signals received from the data processing device in the communication mode.

In the data driving device, the second communication unit may include a transmission module configured to transmit a signal to the second communication line, a reception module configured to receive a signal from the second communication line, and a monitoring module configured to compare a TX signal transmitted by the transmission module with an RX signal received by the reception module and to generate an error when the TX signal and the RX signal are different. When the error is generated, the transmission module may adjust a voltage of the second communication line to a first signal level.

Still another embodiment provides a system including: a data processing device configured to transmit image data; and a plurality of data driving devices configured to drive a pixel disposed on a panel according to the image data, wherein the data processing device and the plurality of data driving devices are connected one to one through a plurality of first communication lines, the data processing device and the plurality of data driving devices are connected through a second communication line including a common bus, the data processing device transmits the image data with a first clock embedded therein through the first communication lines, the data driving devices transmit a training state of the first clock through the second communication line, and the data processing device and the data driving devices transmit and receive at least some information through the second communication line.

In the system, when one data driving device among the plurality of data driving devices changes a voltage of the second communication line to a first signal level while another data driving device receives the at least some information through the second communication line, the other data driving device may disregard the received information and may output the voltage at the first signal level to the second communication line.

As described above, according to the present disclosure, it is possible to accelerate data communication in a display device. According to the present disclosure, it is also possible to transmit, through an auxiliary communication line, information that can be transmitted through an existing main communication line. Further, according to the present disclosure, it is possible to facilitate data communication via a main communication line by transmitting and receiving information through an auxiliary communication line before communication is performed via the main communication line. In addition, according to the present disclosure, it is possible to transmit and receive at least some information through a lock communication line for checking a clock training state.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
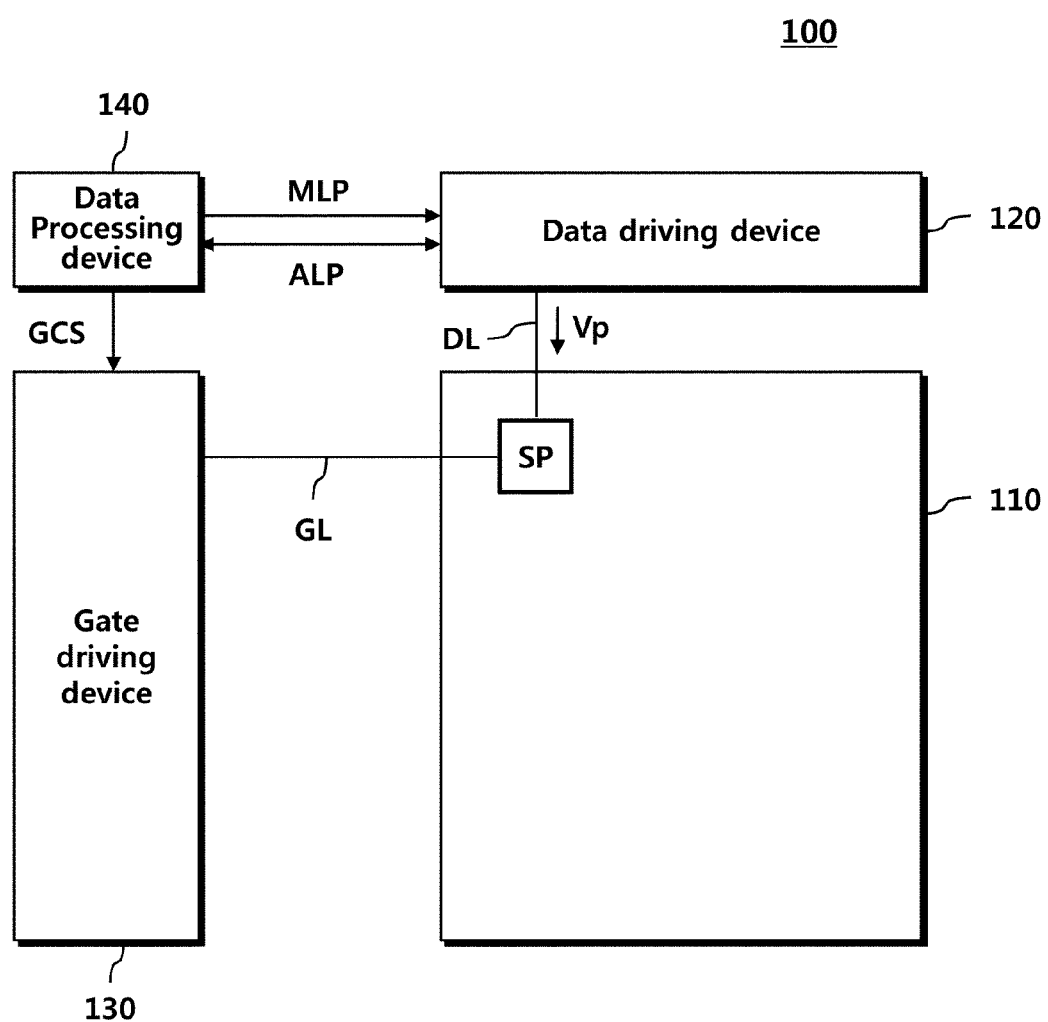
FIG. 1 illustrates the configuration of a display device according to an embodiment.

Hereinafter, some embodiments of the present disclosure will be described in detail with reference to the accompanying drawings. In adding reference numerals to elements in each drawing, the same elements will be designated by the same reference numerals as far as possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence or the like of a corresponding structural element are not limited by the term. When it is described in the specification that one component is "connected," "coupled" or "joined" to another component, it should be read that the first component may be directly connected, coupled or joined to the second component, but also a third component may be "connected," "coupled," and "joined" between the first and second components.

FIG. 1 illustrates the configuration of a display device according to an embodiment.

Referring to FIG. 1, the display device 100 may include a display panel 110, a data driving device 120, a gate driving device 130, and a data processing device 140.

A plurality of data lines DL and a plurality of gate lines GL may be disposed on a display panel 110, and a plurality of pixels may be disposed on the display panel 110. A pixel may include a plurality of sub-pixels SP. The sub-pixels may be red (R), green (G), blue (B), and white (W) sub-pixels. One pixel may include RGB sub-pixels SP, RGBG sub-pixels SP, or RGBW sub-pixels SP. Hereinafter, for the convenience of explanation, one pixel is described as including RGB sub-pixels.

The data driving device 120, the gate driving device 130, and the data processing device 140 are devices that generate signals to display an image on the display panel 110.

The gate driving device 130 may supply a gate driving signal of a turn-on voltage or a turn-off voltage to a gate line GL. When a gate driving signal of a turn-on voltage is supplied to a sub-pixel SP, the sub-pixel SP is connected to a data line DL. When a gate driving signal of a turn-off voltage is supplied to the sub-pixel SP, the sub-pixel SP is disconnected from the data line DL. The gate driving device 130 may be referred to as a gate driver.

The data driving device 120 may supply a data voltage Vp to a sub-pixel SP through a data line DL. The data voltage Vp supplied to the data line DL may be supplied to the sub-pixel SP according to a gate drive signal. The data driving device 120 may be referred to as a source driver.

The data driving device 120 may include at least one integrated circuit, and the at least one integrated circuit may be connected to a bonding pad of the display panel 110 in a tape-automated-bonding (TAB) type or a chip-on-glass (COG) type or may be disposed directly on the display panel 110. According to an embodiment, the at least one integrated circuit may be integrated with the display panel 110. In addition, the data driving device 120 may be configured in a chip-on-film (COF) type.

The data processing device 140 may supply a control signal to the gate driving device 130 and the data driving device 120. For example, the data processing device 140 may transmit a gate control signal GCS, which initiates scanning, to the gate driving unit 130. Then, the data processing device 140 may output image data to the data driving device 120. Further, the data processing device 140 may transmit a data control signal that controls the data driving device 120 to supply a data voltage Vp to each sub-pixel SP. The data processing device 140 may be referred to as a timing controller.

The data processing device 140 may transmit image data and a data control signal using a main communication signal MLP with a clock embedded therein. Hereinafter, a communication signal including image data is referred to as a main communication signal. However, since this embodiment is not limited by this term, the communication signal including the image data may also be referred to as a first communication signal.

The data driving device 120 may transmit the training state of the clock embedded in the main communication signal MLP to the data processing device 140 through an auxiliary communication signal ALP. Hereinafter, a different communication signal distinguished from the main communication signal MLP is referred to as an auxiliary communication signal. However, since this embodiment is not limited by this term, the different communication signal may also be referred to as a second communication signal.

The data driving device 120 and the data processing device 140 may transmit and receive at least some information using the auxiliary communication signal ALP. For example, the data processing device 140 may transmit some of the configuration information about the data driving device 120 using the auxiliary communication signal ALP. In another example, the data driving device 120 may transmit information about a response to a request of the data processing device 140 using the auxiliary communication signal ALP.

Figure 2:
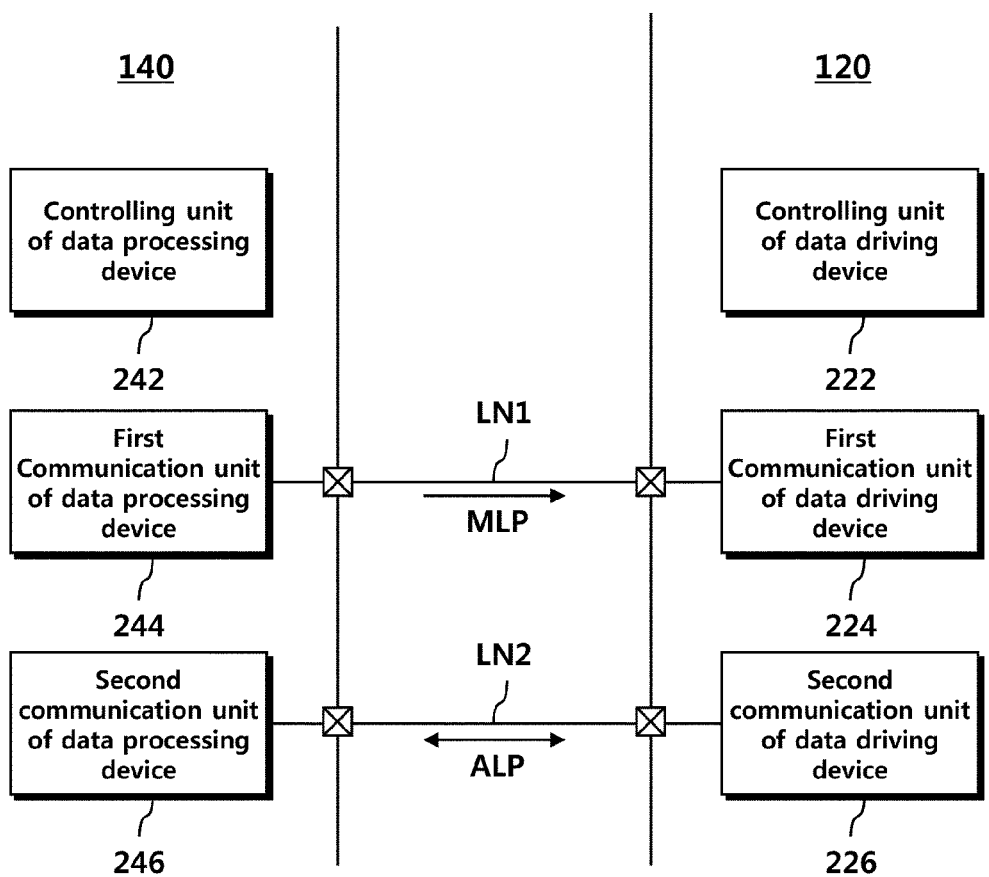
FIG. 2 illustrates the configuration of a data processing device and a data driving device and the connection relationship therebetween according to an embodiment.

FIG. 2 illustrates the configuration of a data processing device and a data driving device and the connection relationship therebetween according to an embodiment.

Referring to FIG. 2, the data processing device 140 may include a controlling unit 242, a first communication unit 244, and a second communication unit 246. The data driving device 120 may include a controlling unit 222, a first communication unit 224, and a second communication unit 226.

The first communication unit 244 of the data processing device 140 and the first communication unit 224 of the data driving device may be connected through a first communication line LN1. The first communication unit 244 of the data processing device 140 may transmit a main communication signal MLP to the first communication unit 224 of the data driving device through the first communication line LN1.

The second communication unit 246 of the data processing device 140 and the second communication unit 226 of the data driving device may be connected through a second communication line LN2. The second communication unit 246 of the data processing device 140 and the second communication unit 226 of the data driving device may transmit an auxiliary communication signal ALP through the second communication line LN2.

The main communication signal MLP may include image data indicating the greyscale value of a pixel, and the auxiliary communication signal ALP may include a signal indicating a clock training state of the data driving device 120.

Figure 3:
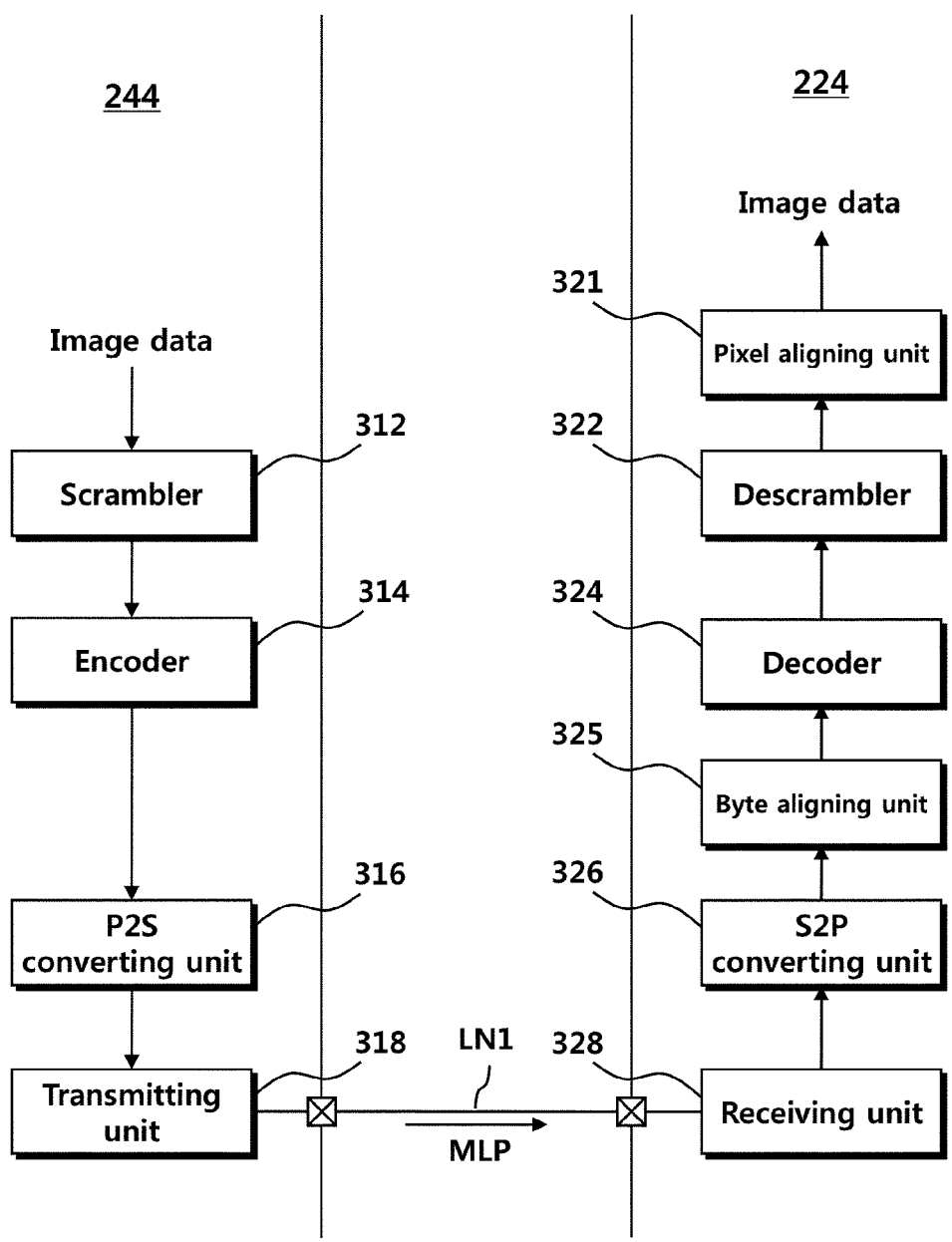
FIG. 3 illustrates the configuration of a first communication unit of a data processing device and a first communication unit of a data driving device according to an embodiment.

FIG. 3 illustrates the configuration of a first communication unit of a data processing device 140 and a first communication unit of a data driving device according to an embodiment.

Referring to FIG. 3, a first communication unit 244 of the data processing device 140 may include a scrambler 312, an encoder 314, a P2S converting unit 316, and a transmitting unit 318, and a first communication unit 224 of the data driving device may include a receiving unit 328, an S2P converting unit 326, a byte aligning unit 325, a decoder 324, a descrambler 322, and a pixel aligning unit 321.

The scrambler 312 scrambles data, for example, image data. Scrambling is a process of shuffling bits of transmitted data, thereby preventing the same bit, for example, is or Os, from consecutively occurring K times or more (where K is a natural number of two or greater) in a transmission stream of the data. Scrambling is performed according to a previously agreed protocol, and the descrambler 322 may perform a function of restoring a stream in which bits are shuffled to original data.

The encoder 314 may encode P bits of a transmission stream of the data into Q bits. P may be, for example, 8 and Q may be, for example, 10. Encoding 8-bit data into 10-bit data is referred to as 8B10B encoding. 8B10B encoding is an encoding method with a DC balance code.

The encoder 314 may encode the data such that the number of bits of the transmission stream is increased. The encoded data may be decoded by the decoder 324 with a DC balance code, for example, 8B10B. Alternatively, the encoded data may be restored to the original bits by the decoder 324.

The encoder 314 may use a limited run length code (LRLC) in encoding the data. A run length refers to an arrangement of the same bit consecutively occurring, and the LRLC controls specific in-between bits of the data so that the run length does not exceed a predetermined size in the data.

When the encoder 314 encodes the data using the LRLC, the decoder 314 may decode the data according to an LRLC method used by the encoder 314.

Data transmitted in parallel in the data processing device 140 may be serially converted for transmission between the data processing device 140 and the data driving device 120. Serial-to-parallel conversion of data may be performed by the P2S converting unit 316. The S2P converting unit 326 may perform a function of converting serially received data in parallel.

The serially converted data may be transmitted to the data driving device through the transmitting unit 318 of the data processing device 140. Here, the data may be transmitted in the form of a main communication signal MLP through a first communication line LN1.

The data received by the data driving device 120 may be transmitted to the byte aligning unit 325, the decoder 324, the descrambler 322, and the pixel aligning unit 321 via the receiving unit 328 and the S2P converting unit 326.

The transmitting unit 318 may transmit data through at least one first communication line LN1. Each first communication line LN1 may include two signal lines to transmit a signal in a differential manner. When a plurality of first communication lines LN1 is used, the transmitting unit 318 may transmit data in a distributed manner through the plurality of first communication lines LN1. The receiving unit 328 may collect signals received in a distributed manner through the plurality of first communication lines LN1, thereby configuring data.

The data driving device 120 may train a data link according to link data included in the main communication signal MLP. The byte aligning unit 325 and the pixel aligning unit 321 may align the data in bytes and in pixels according to the trained data link.

The byte aligning unit 325 may align the data in bytes. A byte is a basic unit forming information included in the data and may be, for example, 8 bits, 10 bits, or the like. The byte aligning unit 325 may align the data so that the data serially transmitted can be read in bytes.

The pixel aligning unit 321 may align the data in pixels. The data may sequentially include information corresponding to RGB sub-pixels. The pixel aligning unit 321 may align the data so that the data serially transmitted can be read in pixels.

When image data is aligned in pixels by the pixel aligning unit 321, greyscale data may be generated for each sub-pixel.

Figure 4:
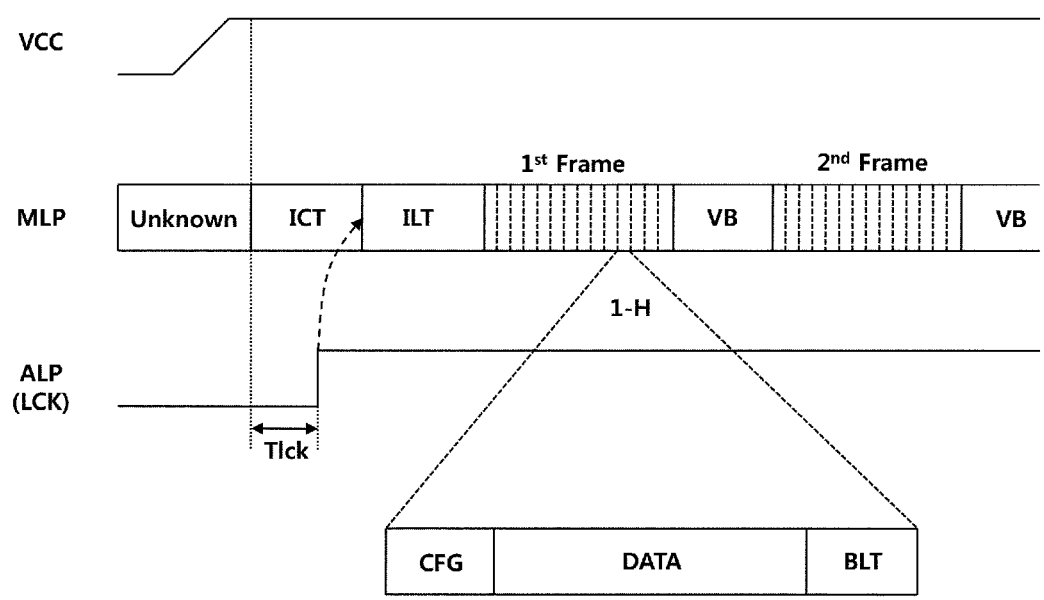
FIG. 4 illustrates a first example of a sequence of a main communication signal and an auxiliary communication signal in a display device according to an embodiment.

FIG. 4 illustrates a first example of a sequence of a main communication signal and an auxiliary communication signal in a display device according to an embodiment. In FIG. 4, the waveform of a driving voltage VCC supplied to a data processing device 140 and a data driving device 120 is shown for supplement.

When the driving voltage VCC is supplied to the data processing device 140, the data processing device 140 may transmit a clock pattern to the data driving device 120 within a predetermined time. The clock pattern may be transmitted via a main communication signal MLP.

The data driving device 120 may receive the clock pattern and may train a clock according to the clock pattern. After completely training the clock, the data driving device 120 may change the voltage of an auxiliary communication signal ALP formed in a second communication line from a first signal level, for example, a low-voltage level, to a second signal level, for example, a high-voltage level.

The data processing device 140 and the data driving device 120 may perform communication using a phase-locked loop (PLL) method. In this method, the data driving device 120 may generate an internal clock in accordance with the frequency and phase of the clock pattern.

The data driving device 120 may complete clock training within a training time limit Tick. The data processing device 140 may transmit the clock pattern for an initial clock training period ICT that is the training time limit Tick plus a predetermined margin time.

Clock training may be performed at an early stage for transmitting data. When a link between the data processing device 140 and the data driving device 120 is broken, clock training may be performed again.

After the clock training is completed, the data processing device 140 may transmit link data through the main communication signal MLP.

The data driving device 120 may receive the link data according to the clock and may train a data link according to the link data. Link training may be performed for an initial link training period ILT in which the data processing device 140 transmit the link data.

The link training may be performed at an early stage for transmitting data. When the link is broken between the data processing device 140 and the data driving device 120, link training may be performed again.

After the link training is completed, the data processing device 140 may transmit image data through the main communication signal MLP.

The image data may be transmitted per frame. There may be a frame blank (vertical blank: VB) period between transmissions of image data per frame.

One frame period may include a plurality of sub-time periods, and image data may be transmitted in one period of each sub-time period.

For example, one frame period may include a plurality of H time periods (horizontal periods) 1-H respectively corresponding to a plurality of lines of a display panel. The data processing device 140 may transmit image data corresponding to each line in each H time period 1-H.

The H time period 1-H may include a configuration transmission period, an image transmission period, and a horizontal blank period, for example, for a data processing device 140. The data processing device 140 may transmit image data in the image transmission period of each H time period 1-H. For the data driving device 120, the H time period 1-H may include a configuration reception period CFG, an image reception period DATA, and a horizontal blank period BLT. The data driving device 120 may receive image data in the image reception period DATA.

The data driving device 120 may receive the image data in the image reception period DATA and may align the image data according to the data link. Since the image data is transmitted without any clock or link signal, the data driving device needs to properly separate and read the image data. Accordingly, the data driving device 120 may align the image data according to the data link and may properly separate and read the image data.

The data driving device 120 may check configuration data, image data, or link data, and may generate a failure signal when the configuration data, the image data, or the link data is against a predefined protocol. The failure signal indicates that the link between the data processing device 140 and the data driving device 120 is broken. The data driving device 120 may count failure signals, and may transmit a signal for changing the training state of the clock through the second communication line connected to the data processing device 140 when a failure signal occurs N times or more (where N is a natural number).

When the training state of the clock is changed, the data processing device 140 may retransmit the clock pattern for the initial clock training period ICT and may retransmit the link data for the initial link training period ILT in the initial stage. The data driving device 120 may perform the process of training the communication clock according to the clock pattern and training the data link according to the link data again.

The data driving device 120 may receive not only information, for example, configuration information, from the data processing device 140 through the main communication signal MLP but also at least some information through an auxiliary communication signal ALP in the configuration reception period CFG. An example in which the data driving device 120 and the data processing device 140 transmit and receive at least some information using the auxiliary communication signal ALP will be described with reference to FIG. 7 to FIG. 17.

Figure 5:
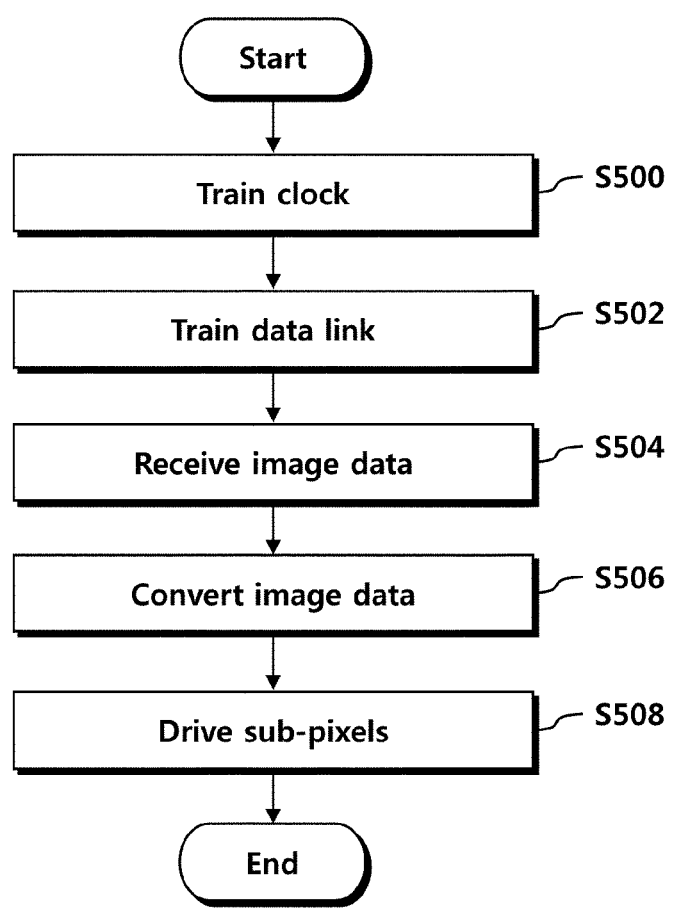
FIG. 5 is a flowchart illustrating a pixel driving method of a display device according to an embodiment.

FIG. 5 is a flowchart illustrating a pixel driving method of a display device according to an embodiment. The pixel driving method to be described with reference to FIG. 5 may be implemented by the foregoing data driving device 120.

Referring to FIG. 5, the data driving device 120 may receive a clock pattern and may train a clock according to the clock pattern (S500).

After the clock is trained, the data driving device 120 may receive link data according to the clock and may train a data link according to the link data (S502). In the operation of training the data link (S502), the data driving device 120 may train the data link by aligning the link data in bytes and in pixels.

After the data link is trained, the data driving device 120 may receive image data according to the data link (S504).

The data driving device 120 may convert, for example, decode and descramble, the image data according to information indicated by the link data (S506).

The data driving device 120 may drive sub-pixels using a data voltage generated through the conversion of the image data (S508).

Figure 6:
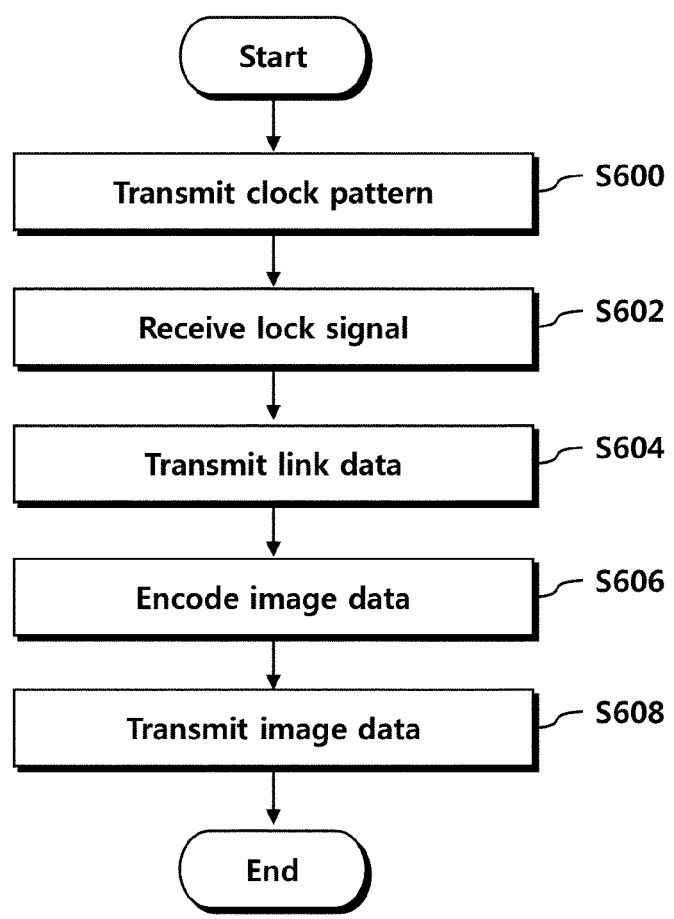
FIG. 6 is a flowchart illustrating an image data transmission method of a display device according to an embodiment.

FIG. 6 is a flowchart illustrating an image data transmission method of a display device according to an embodiment.

The image data transmission method to be described with reference to FIG. 6 may be implemented by the foregoing data processing device 140.

Referring to FIG. 6, the data processing device 140 may transmit a clock pattern indicating a clock to the data driving device 120 (S600). The data driving device 120 may train the clock according to the clock pattern. When the clock is completely trained, the data driving device 120 may transmit a lock signal to the data processing device 140. Here, the lock signal is a signal indicating a clock training completion state among signals indicating a clock training state.

After receiving the lock signal (S602), the data processing device 140 may transmit link data to the data driving device 120 (S604). The data processing device 140 may transmit the link data in synchronization with the clock.

The data processing device 140 may encode image data (S606) and may transmit the encoded image data to the data driving device 120 (S608).

The operation of encoding the image data (S606) may include scrambling the image data or encoding the image data with an LRLC.

Figure 7:
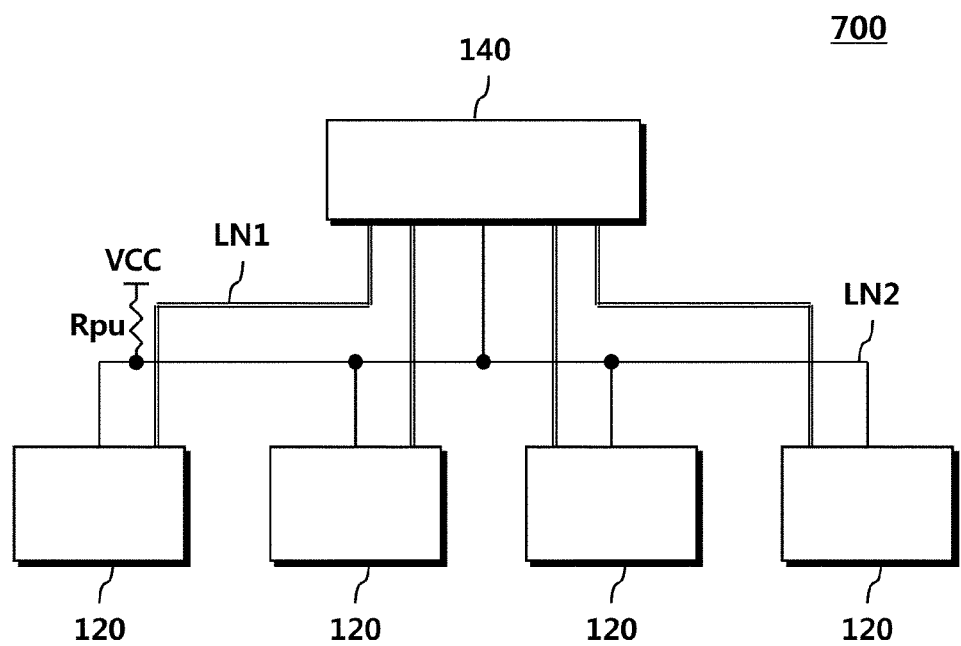
FIG. 7 illustrates the configuration of a display driving system according to an embodiment.

FIG. 7 illustrates the configuration of a display driving system according to an embodiment.

Referring to FIG. 7, the driving system 700 may include a data processing device 140 and a plurality of data driving devices 120.

The data processing device 140 and the plurality of data driving devices 120 may be connected one to one through a plurality of first communication lines LN1. The data processing device 140 and the plurality of data driving devices 120 may be connected through a second communication line LN2 configured as a common bus.

Each first communication line LN1 may be a differential signal line including two signal lines, and the second communication line LN2 may be a single signal line driven as an open drain. A pull-up resistor Rpu may be connected to the second communication line LN2. One side of the pull-up resistor Rpu may be connected to the second communication line LN2, and a driving voltage VCC may be supplied through the other side thereof.

The first communication line LN1 may be a differential signal line driven by a current, and the second communication line LN2 may be a single signal line driven as an open drain. According to this configuration, the data rate of a main transmission signal transmitted through the first communication line LN1 may be higher than the data rate of an auxiliary communication signal transmitted or received through the second communication line LN2.

The plurality of data driving devices 120 may be connected to the second communication line (LN2), and this connection enables a multidrop.

The data processing device 140 may transmit image data having a clock embedded therein to the data driving devices 120 through the first communication line LN1. The data processing device 140 may transmit a communication signal having a clock embedded therein to the data driving devices 120 through the second communication line LN2. The clock transmitted through the first communication line LN1 and the clock transmitted through the second communication line LN2 may have different frequencies or different voltage levels. To distinguish these clocks, hereinafter, the clock transmitted through the first communication line LN1 is referred to as a first clock, and the clock transmitted through the second communication line LN2 is referred to as a second clock.

The data processing device 140 may transmit a main communication signal having the first clock embedded therein through the first communication line LN1, and the data driving devices 120 may transmit the training state of the first clock through the second communication line LN2. A signal indicating a state in which training of the first clock is completed may be referred to as a lock signal, and the data driving devices 120 may transmit a lock signal to the data processing device 140 through the second communication line LN2.

The data processing device 140 and the data driving devices 120 may transmit and receive at least some information through the second communication line LN2. The information transmitted through the second communication line LN2 may be part of configuration information that can be transmitted in a configuration reception period (see CFG in FIG. 4) through the first communication line LN1 or may be information other than the configuration information.

Not only the data processing device 140 may transmit information to the data driving devices 120 through the second communication line LN2, but the data driving devices 120 may also transmit information to the data processing device 140 through the second communication line LN2.

A first communication unit (see 244 in FIG. 2) of the data processing device 140 may be connected to a first communication unit (see 224 in FIG. 2) of each data driving device 120 through the first communication line LN1, and a second communication unit (see 246 in FIG. 2) of the data processing device 140 may be connected to a second communication unit (see 226 in FIG. 2) of the data driving device 120 through the second communication line LN2. Since the first communication unit (see 244 in FIG. 2) of the data processing device 140 and the first communication unit (see 224 in FIG. 2) of the data driving device 120 have been described with reference to FIG. 3, the following description will focus on the second communication unit (see 246 in FIG. 2) of the data processing device 140 and the second communication unit (see 226 in FIG. 2) of the data driving device 120.

Figure 8:
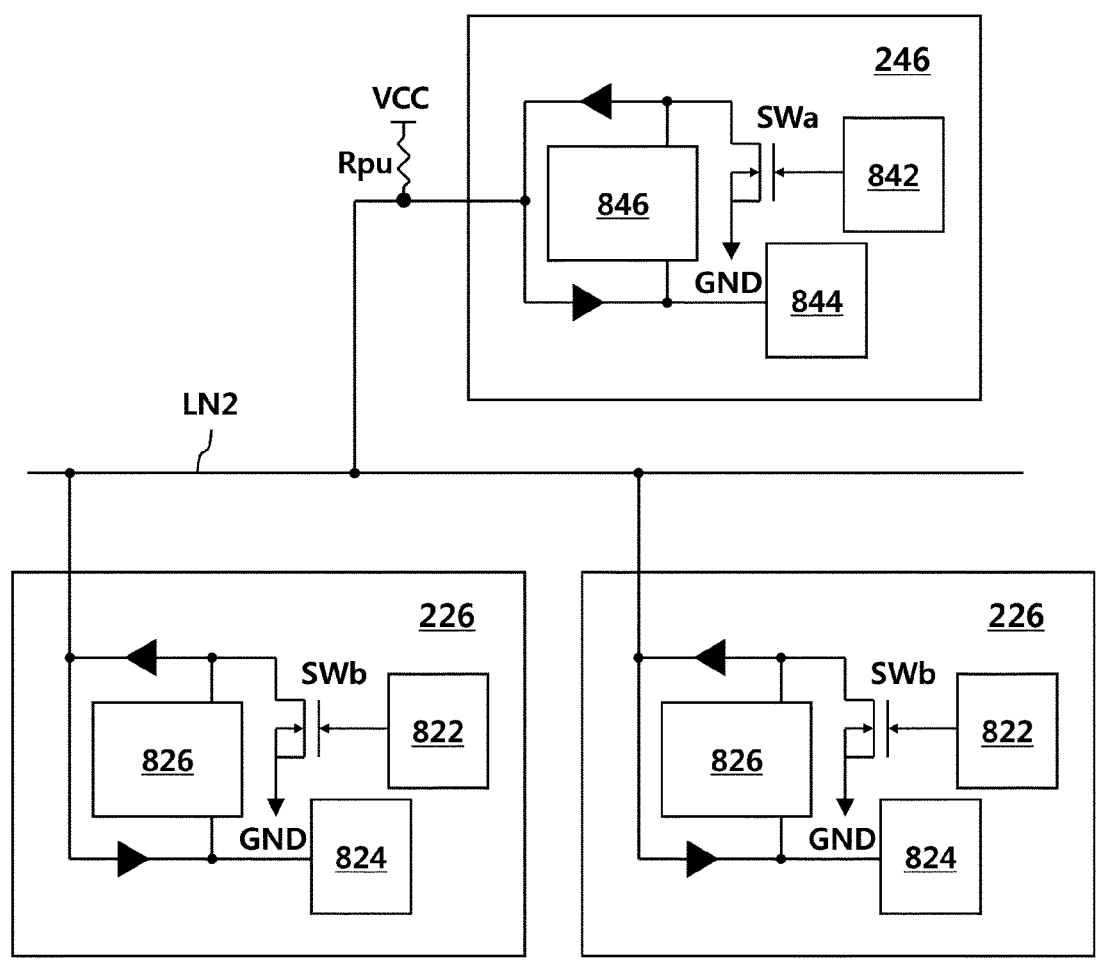
FIG. 8 illustrates the configuration of a second communication unit of a data processing device and a second communication unit of a data driving device according to an embodiment.

FIG. 8 illustrates the configuration of a second communication unit of a data processing device 140 and a second communication unit of a data driving device 120 according to an embodiment.

Referring to FIG. 8, the second communication unit 246 of the data processing device 140 may include a transmission module 842, a reception module 844, a monitoring module 846, and a switch SWa. The second communication unit 226 of the data driving device 120 may include a transmission module 822, a reception module 824, a monitoring module 826, and a switch SWb. To avoid confusion, the components of the second communication unit 246 of the data processing device 140 will be referred to as a P-transmission module 842, a P-reception module 844, a P-monitoring module 846, and a P-switch Swa, respectively in the following description. Further, the components of the second communication unit 226 of the data driving device 120 will be referred to as a D-transmission module 822, a D-reception module 824, a D-monitoring module 826, and a D-switch SWb, respectively.

The P-transmission module 842 and the D-transmission module 822 may transmit a signal through a second communication line LN2. A pull-up resistor Rpu may be connected to the second communication line LN2. The P-transmission module 842 and the D-transmission module 822 may change the voltage of the second communication line LN2 from a first signal level, for example, a ground voltage GND, to a second signal level, for example, a driving voltage VCC, through on-off control of the P-switch SWa and the D-switch SWb. One side of each of the P-switch SWa and the D-switch SWb may be connected to the second communication line LN2, and the other side thereof may be connected to a low voltage source, for example, the ground. The P-transmission module 842 and the D-transmission module 822 may control the signal voltage of the second communication line LN2 through on-off control of the P-switch SWa and the D-switch SWb. For example, when the P-switch SWa or the D-switch SWb is turned on, the voltage of the second communication line LN2 is a low voltage, for example, the ground voltage GND; when the P-switch SWa and the D-switch SWb are turned off, the voltage of the second communication line LN2 is a high voltage, for example, the driving voltage VCC.

The P-transmission module 842 may transmit information to the data driving device 120 through control of the P-switch SWa. The D-transmission module 822 may transmit a signal indicating a clock training state, for example, a lock signal, or other information to the data processing device 140 through control of the D-switch SWb.

The P-reception module 844 and the D-reception module 824 may receive a signal from the second communication line LN2.

When two devices simultaneously control the second communication line LN2, a fault may occur in the second communication line LN2.

For example, the D-transmission module 822 may change the voltage of the second communication line LN2 when it is necessary to perform clock training again, such as when the data driving device 120 abnormally operates. In one example, when a link for a main communication signal is broken, the D-transmission module 822 may change the voltage of the second communication line LN2 to the first signal level, for example, the ground voltage. When the D-transmission module 822 changes the voltage of the second communication line LN2 while the P-transmission module 842 or a D-transmission module 822 of another data driving device 120 transmits information through the second communication line LN2, a fault may occur as described above.

The P-monitoring module 846 and the D-monitoring module 826 may detect the fault.

The P-monitoring module 846 may compare a TX signal transmitted by the P-transmission module 842 with an RX signal received by the P-reception module 844, and may generate an error when the TX signal is different from the RX signal. When the P-monitoring module 846 generates an error, the P-transmission module 842 may adjust the voltage of the second communication line LN2 to the first signal level, for example, the ground voltage.

The D-monitoring module 826 may compare a TX signal transmitted by the D-transmission module 822 with an RX signal received by the D-reception module 824, and may generate an error when the TX signal is different from the RX signal. When the D-monitoring module 826 generates an error, the D-reception module 824 may adjust the voltage of the second communication line LN2 to the first signal level, for example, the ground voltage.

When the second communication units, for example, the monitoring modules 846 and 826, generate an error, the first communication units may perform a clock recovery sequence for retraining a first clock. Here, the clock recovery sequence may include the operations of the data processing device 140 and the data driving device 120 in the initial clock training period (ICT of FIG. 4) described with reference to FIG. 4.

A predetermined protocol may be applied to an auxiliary communication signal transmitted or received through the second communication line LN2. In particular, when information is transmitted or received through the second communication line LN2, the predetermined protocol may be applied to the auxiliary communication signal.

Figure 9:
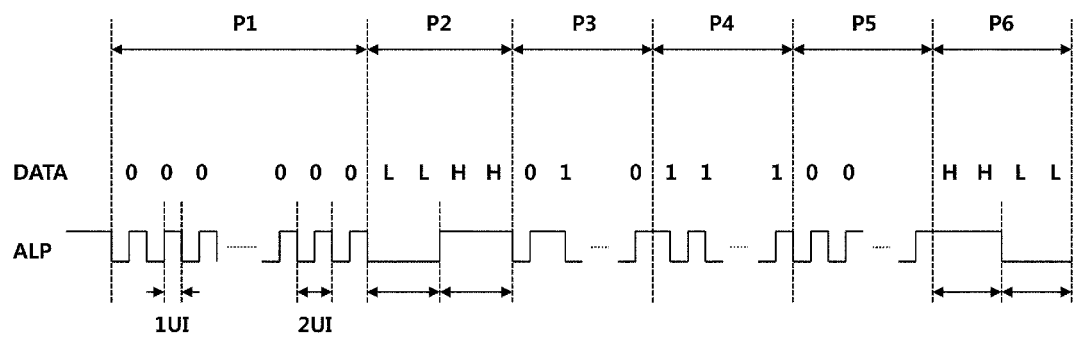
FIG. 9 illustrates the configuration of an information transceiving protocol for an auxiliary communication signal in a display device according to an embodiment.

FIG. 9 illustrates the configuration of an information transceiving protocol for an auxiliary communication signal in a display device according to an embodiment.

Referring to FIG. 9, one message in an auxiliary communication signal may include six parts P1 to P6.

A clock may be transmitted through a first part P1. In an auxiliary communication signal, data bits may be encoded using a Manchester-II code, in which one bit may include two unit pulses (UI). In Manchester-II coding, when all data bits transmitted in the first part P1 are 0 or 1, a pulse synchronized with the clock may be transmitted.

A receiving side may perform training according to the clock received via the first part P1. To distinguish the clock from a clock transmitted via a main communication line, the clock transmitted and received via the first part P1 may be referred to as a second clock.

After the second clock is transmitted, a start signal indicating the start of a message may be transmitted through a second part P2, and an end signal indicating the end of the message is transmitted via a sixth part P6, which is the last part of the message.

A message header may be transmitted via a third part P3. The message header may include the values of parameters, such as a data type, a mode, the identification (ID) of the receiving side, a data length, and the configuration register address of the receiving side.

A fourth part P4 may include information transmitted and received through the message.

A fifth part P5 may include a checksum, and the checksum is the least significant bit (LSB) of the result of adding data bytes in the third part P3 and the fourth part P4 and may include M bits (where M is a natural number).

The auxiliary communication signal may be divided into a plurality of modes, and a data processing device 140 and a data driving device 120 may perform different operations in the respective modes.

Figure 10:
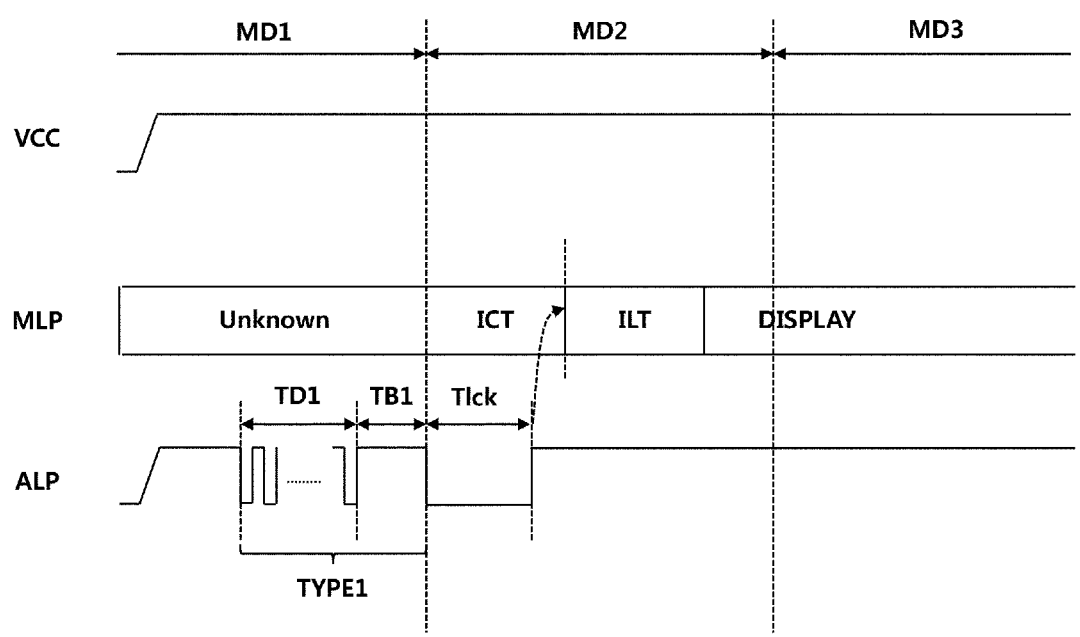
FIG. 10 illustrates a second example of a sequence of a main communication signal and an auxiliary communication signal in a display device according to an embodiment.

FIG. 10 illustrates a second example of a sequence of a main communication signal and an auxiliary communication signal in a display device according to an embodiment.

Referring to FIG. 10, the auxiliary communication signal ALP may be divided into three modes MD1, MD2, and MD3. An auxiliary communication signal ALP corresponding to a first mode MD1 may be transmitted and received in an initial time after the operation is started; an auxiliary communication signal ALP corresponding to a second mode MD2 may be transmitted and received when the first mode MD1 ends; an auxiliary communication signal ALP corresponding to a third mode MD3 may be transmitted and received when the second mode MD2 ends.

According to signal classification, the auxiliary communication signal ALP may be divided into a lock mode and a communication mode, in which the first mode MD1 may correspond to the communication mode, the second mode MD2 may correspond to the lock mode, and the third mode MD3 may be a mode in which the lock mode and the communication mode are combined. In the lock mode, a data driving device 120 may transmit a lock signal or a lock failure signal, which is a signal indicating that clock training has failed, to a data processing device 140 using the auxiliary communication signal ALP. In the communication mode, the data driving device 120 or the data processing device 140 may transmit information or may request information using the auxiliary communication signal ALP.

When a driving voltage VCC is supplied, the data processing device 140 and the data driving device 120 may operate in the first mode MD1. In the first mode MD1, a main communication signal MLP may not be used but may remain unknown. Further, in the first mode MD1, the data processing device 140 may transmit at least some of the configuration information to the data driving device 120 through a second communication line. A message for transmitting the configuration information may be defined as a first-type message TYPE1. After receiving the first-type message TYPE1, the data driving device 120 may receive a training signal for a first clock via the main communication signal MLP.

The first-type message TYPE1 may include a first data period TD1 for transmitting data and a first blank period TB1 for maintaining a time period. In the first data period TD1, the data processing device 140 may transmit a message according to the protocol described with reference to FIG. 9. In the first blank period TB1, the data processing device 140 may change the voltage of the second communication line to a second signal level, for example, a driving voltage VCC.

The data processing device 140 may set various parameters of the data driving device 120 through the first-type message TYPE1. The parameters may be set in sequence before transmitting or receiving the main communication signal MLP. Accordingly, the data processing device 140 may preliminarily set parameters necessary to transmit and receive the main communication signal MLP through the auxiliary communication signal ALP.

When the first blank period TB1 ends, the data driving device 120 may change the voltage of the second communication line to a first signal level, for example, a ground voltage, to thereby indicate that clock training is ready, and the data processing device 140 may transmit a clock training signal, which is a clock pattern, using a first communication line. This mode may be referred to as the second mode MD2.

In the second mode MD2, the data driving device 120 may receive the training signal, which is a clock pattern, for the first clock. When clock training is completed, the data driving device 120 may change the voltage of the second communication line to the second signal level, for example, the driving voltage VCC, and may transmit a signal for a clock training state through the auxiliary communication signal ALP.

The data driving device 120 may perform clock training within a training time limit Tick. The data processing device 140 may maintain an initial clock training period ICT to be longer than the training time limit T1$ck$.

Link training is performed after the clock training. After a predetermined margin time since an initial link training period ILT ends, the second mode MD2 may be switched to the third mode MD3.

Figure 11:
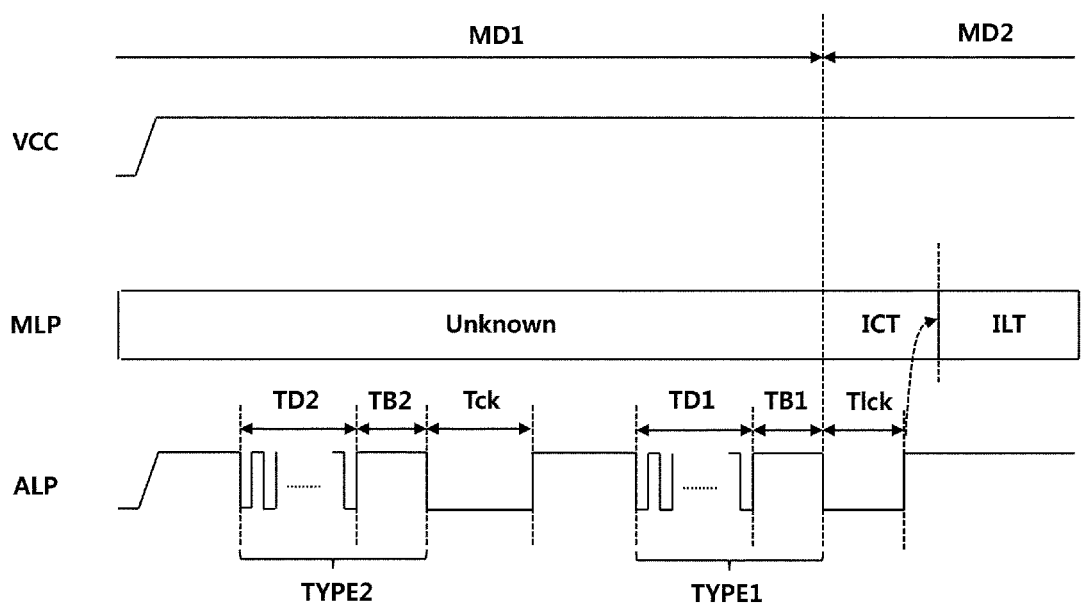
FIG. 11 illustrates a third example of a sequence of a main communication signal and an auxiliary communication signal in a display device according to an embodiment.

FIG. 11 illustrates a third example of a sequence of a main communication signal and an auxiliary communication signal in a display device according to an embodiment.

Referring to FIG. 11, in a first-mode MD1 period, which is an initial time after the operation is started, a data processing device 140 may transmit a state check command to check the state of a data driving device 120 through a second-type message TYPE2.

The second-type message TYPE2 may include a second data period TD2 for transmitting data and a second blank period TB2 for maintaining a time period. In the second data period TD2, the data processing device 140 may transmit a message according to the protocol described with reference to FIG. 9. Here, the second data period TD2 may include a command to check the state of a receiving side. In the second blank period TB2, the data processing device 140 may change the voltage of a second communication line to a second signal level, for example, a driving voltage VCC.

The data driving device 120 may respond to the state check command. When there is no abnormality in the data driving device 120, the data driving device 120 may maintain the voltage of the second communication line at a first signal level, for example, a ground voltage, for a predetermined time. Here, when the voltage of the second communication line is maintained at the first signal level for ½ or more of a preset check time Tck, the data processing device 140 may determine that the data driving device 120 normally operates. When it is determined that the data driving device 120 does not normally operate, the data processing device 140 may retransmit the second-type message TYPE2.

According to a sequence, the second-type message TYPE2 may be transmitted first, and a first-type message TYPE1 may subsequently be transmitted.

Figure 12:
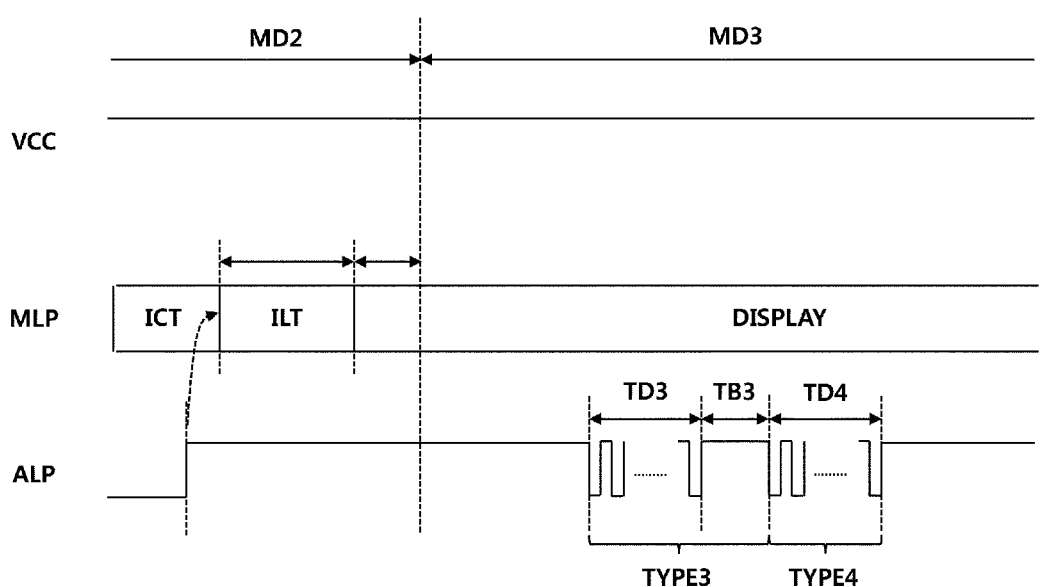
FIG. 12 illustrates a fourth example of a sequence of a main communication signal and an auxiliary communication signal in a display device according to an embodiment.

FIG. 12 illustrates a fourth example of a sequence of a main communication signal and an auxiliary communication signal in a display device according to an embodiment.

Referring to FIG. 12, in a third mode MD3 in which image data is transmitted and received through a main communication signal MLP, a data processing device 140 or a data driving device 120 may transmit a request command via a third-type message TYPE3, and the data driving device 120 or the data processing device 140 may transmit reply data to the request command via a fourth-type message TYPE4.

The third-type message TYPE3 may include a third data period TD3 for transmitting data and a third blank period TB3 for maintaining a time period. In the third data period TD3, the data processing device 140 or the data driving device 120 may transmit a message according to the protocol described with reference to FIG. 9. Here, the third data period TD3 may include a command to request information about a receiving side. In the third blank period TB3, the data processing device 140 or the data driving device 120 may change the voltage of a second communication line to a second signal level, for example, a driving voltage VCC.

The data driving device 120 or the data processing device 140 may transmit the reply data through a fourth-type message TYPE4 in response to the request command. The reply data may be included in a fourth data period TD4 in which data is transmitted via a fourth-type message TYPE4.

In a second communication unit of the data driving device 120, a communication mode may be divided into a reception mode and a transmission mode. The second communication unit of the data driving device 120 may be switched to the transmission mode or a lock mode after the voltage of the second communication line is maintained at the second signal level for a predetermined time, for example, a first blank period, a second blank period, or the third blank period, in the reception mode.

A message transmitted or received via the auxiliary communication signal ALP, for example, a first-type message, a second-type message, a third-type message, and a fourth-type message, may include an identification number of the receiving side or an identification number of the data driving device 120. The receiving side or the data driving device 120 may stop fault monitoring by a monitoring module of the second communication unit for a predetermined time and may stop control of the second communication line by a transmission module of the second communication unit when the identification number included in the message is different from an identification number thereof.

Figure 13:
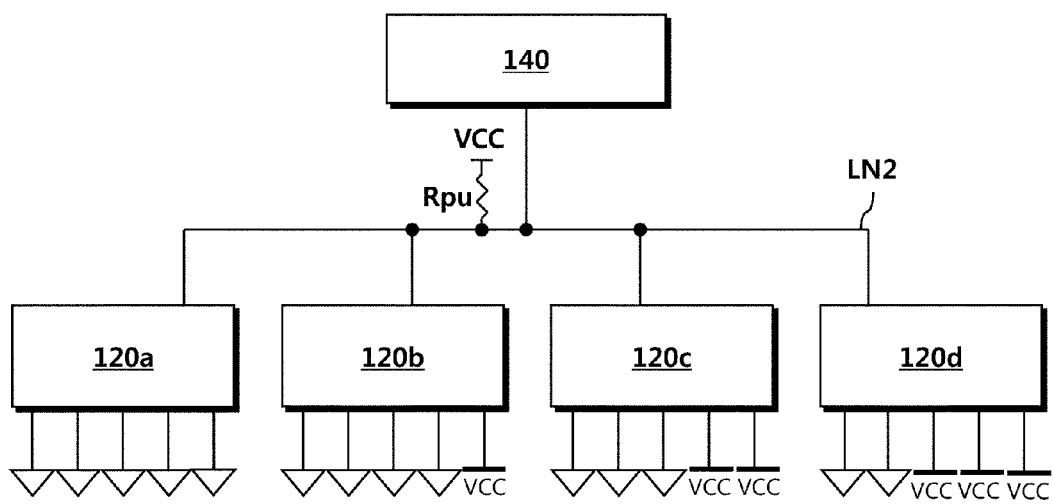
FIG. 13 shows that a data driving device configures an identification number according to an embodiment.

FIG. 13 shows that a data driving device 120 configures an identification number according to an embodiment.

Referring to FIG. 13, an identification number may be configured in each data driving device 120a, 120b, 120c, and 120d.

The identification number may be set by a plurality of pins exposed outside each data driving devices 120a, 120b, 120c, and 120d. For example, when a low voltage, for example, a ground voltage, may be connected to all configuration pins, the identification number is set to 0; when a high voltage, for example, a driving voltage VCC, is connected to only one configuration pin, the identification number may be set to 1.

A message including a state check command, a request command, and the like through an auxiliary communication signal, for example, a first-type message, a second-type message, a third-type message, and a fourth-type message, may include an identification number of the data driving device 120.

The data driving device 120 may process only a signal corresponding to the identification number among auxiliary communication signals received from a data processing device 140.

As described above, according to the present disclosure, it is possible to accelerate data communication in a display device. According to the present disclosure, it is also possible to transmit, through an auxiliary communication line, information that can be transmitted through an existing main communication line. Further, according to the present disclosure, it is possible to facilitate data communication via a main communication line by transmitting and receiving information through an auxiliary communication line before communication is performed via the main communication line. In addition, according to the present disclosure, it is possible to transmit and receive at least some information through a lock communication line for checking a clock training state.

What is claimed is:

1. A data processing device comprising:
a controlling unit configured to process image data;
a first communication unit configured to include the image data in a first communication signal with a first clock embedded therein and to transmit the first communication signal to a data driving device through a first communication line; and
a second communication unit configured to check a training state of the first clock by the data driving device through a second communication line, and to transmit and receive at least some information to and from the data driving device through the second communication line, wherein the second communication unit comprises a transmission module configured to transmit a signal to the second communication line, a reception module configured to receive a signal from the second communication line, and a monitoring module configured to compare a TX signal transmitted by the transmission module with an RX signal received by the reception module and to generate an error when the TX signal and the RX signal are different,
wherein, when the second communication unit generates the error, the first communication unit performs a clock recovery sequence for retraining the first clock.

2. The data processing device of claim 1, wherein the second communication line comprises of a common bus of a single signal line and is connected with a plurality of data driving devices.

3. The data processing device of claim 2, wherein a pull-up resistor is connected to the second communication line, and the second communication unit controls a signal voltage of the second communication line through a switch controlling a connection of the second communication line with a low voltage source.

4. The data processing device of claim 1, wherein the first communication line is a differential signal line driven by a current, the second communication line is a single signal line driven as an open drain, and the data rate of the first communication line is higher than the data rate of the second communication line.

5. The data processing device of claim 1, wherein the second communication unit transmits at least some of configuration information to the data driving device through the second communication line in an initial time after an operation is started, and the first communication unit transmits a training signal for the first clock to the data driving device after the at least some of configuration information is transmitted.

6. The data processing device of claim 5, wherein the first communication unit transmits the training signal for the first clock when a first signal level of voltage is formed in the second communication line by the data driving device after the at least some of the configuration information is transmitted, and determines that a training of the first clock by the data driving device is completed when a second signal level of voltage is formed in the second communication line by the data driving device after the training signal for the first clock is transmitted.

7. The data processing device of claim 1, wherein the second communication unit transmits a state check command to check a state of the data driving device through the second communication line in an initial time after an operation is started, and determines that the data driving device normally operates when a first signal level of voltage is maintained in the second communication line for a predetermined time or longer by the data driving device after transmitting the state check command.

8. The data processing device of claim 1, wherein the second communication unit transmits a request command to the data driving device through the second communication line in a time period in which the image data is transmitted through the first communication line, and receives reply data to the request command from the data driving device through the second communication line after transmitting the request command.

9. The data processing device of claim 8, wherein the request command includes an identification number of the data driving device set by a plurality of pins.

10. A data driving device comprising:
a first communication unit configured to restore a first clock from a first communication signal received through a first communication line and to receive image data included in the first communication signal from a data processing device according to the first clock;
a second communication unit configured to transmit a training state of the first clock to the data processing device through a second communication line and to transmit and receive at least some information to and from the data processing device through the second communication line; and
a controlling unit configured to drive a pixel disposed on a panel according to the image data,
wherein the second communication unit comprises a transmission module configured to transmit a signal to the second communication line, a reception module configured to receive a signal from the second communication line, and a monitoring module configured to compare a TX signal transmitted by the transmission module with an RX signal received by the reception module and to generate an error when the TX signal and the RX signal are different,
wherein when the error is generated, the transmission module adjusts a voltage of the second communication line to a first signal level.

11. The data driving device of claim 10, wherein the second communication unit operates in a lock mode for transmitting the training state of the first clock and in a communication mode for transmitting and receiving the at least some information.

12. The data driving device of claim 11, wherein the communication mode is divided into a reception mode and a transmission mode, and
after a second signal level of voltage is maintained in the second communication line for a predetermined time in the reception mode, the second communication unit changes its mode from the reception mode to the transmission mode or the lock mode.

13. The data driving device of claim 11, wherein the controlling unit checks an identification number set by a plurality of pins, and
the second communication unit processes only a signal corresponding to the identification number among signals received from the data processing device in the communication mode.

14. The data driving device of claim 10, wherein the second communication unit receives at least some of configuration information from the data processing device through the second communication line in an initial time after an operation is started, and
the controlling unit sets some internal parameters according to the at least some of configuration information before receiving a training signal for the first clock.

\* \* \* \* \*